United States Patent
Maier et al.

(10) Patent No.: US 7,087,660 B2
(45) Date of Patent: Aug. 8, 2006

(54) PREPARATION OF COMPONENTS AND ARTICLES WITH DIRECTED HIGH FREQUENCY ENERGY HEATED SILICA-RICH RUBBER COMPONENTS CONTAINING HIGH SOFTENING POINT POLYMER AND SULFUR CURATIVE

(75) Inventors: Thomas Robert Maier, Brecksville, OH (US); Bruce Raymond Hahn, Hudson, OH (US); Brian John Doucet, Akron, OH (US); Thierry Florent Edme Materne, Richfield, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 242 days.

(21) Appl. No.: 10/629,421

(22) Filed: Jul. 29, 2003

(65) Prior Publication Data

US 2005/0022914 A1 Feb. 3, 2005

(51) Int. Cl.
*C08F 2/46* (2006.01)
*C08L 23/26* (2006.01)

(52) U.S. Cl. .................... 522/83; 522/109; 522/110; 522/111; 522/112; 522/150; 522/157; 522/158; 522/159; 522/160; 522/161; 522/911; 524/491; 524/492; 427/508; 264/464; 264/472; 264/474; 264/475; 264/477; 264/486; 264/494; 264/496

(58) Field of Classification Search .................... 522/1, 522/83, 71, 74, 77, 73, 109, 110, 111, 112, 522/150, 157–161, 913; 427/508; 524/492, 524/491; 264/464, 472, 474, 486, 491, 496, 264/494

See application file for complete search history.

(56) References Cited

U.S. PATENT DOCUMENTS

| 3,965,055 | A | * | 6/1976 | Shichman et al. | 525/176 |
|---|---|---|---|---|---|
| 5,089,574 | A | | 2/1992 | Castner | 524/142 |
| 5,448,002 | A | | 9/1995 | Castner | 526/140 |
| 5,627,237 | A | * | 5/1997 | Halasa et al. | 525/236 |
| 5,753,761 | A | | 5/1998 | Sandstrom et al. | 525/236 |
| 5,798,408 | A | * | 8/1998 | Zanzig et al. | 524/505 |
| 5,854,351 | A | | 12/1998 | Maier et al. | 525/197 |
| 6,407,153 | B1 | * | 6/2002 | von Hellens | 524/188 |

OTHER PUBLICATIONS

Pages 35 through 40, "Viscoelastic Characterization of Rubber with a New Dynamic Mechanical Tester" by Pawlowski and Dick as published in *Rubber World*, Jun., 1992.

Pages 21 through 30, "Applications for Stress Relaxation from the RPA in Characterization and Quality Control" by Dick and Pawlowski as published in *Rubber World*, Jan., 1997.

"Applications for the Rubber Process Analyzer" by Dick and Pawlowski as published in *Rubber and Plastics News*, Apr. 26, 1993.

"RPA 2000 Offers New View of Processability Testing" by Dick and Pawlowski as published in Rubber and Plastics News, May 10, 1993.

* cited by examiner

*Primary Examiner*—James V. Seidleck
*Assistant Examiner*—Sanza L. McClendon
(74) *Attorney, Agent, or Firm*—Henry C. Young, Jr.

(57) ABSTRACT

This invention relates to a process of preparation of components and articles of manufacture containing at least one of such components, such as tires, and the resulting prepared components and fabricated articles, by use of directed high frequency energy internally heated silica-rich rubber compositions which contain sulfur curative and a significant content of high softening point polymer, namely a polymer and/or elastomer having a melting point (Tm) and/or high glass transition temperature (Tg) above 0° C., and particularly above 30° C., and which contains a minimal, if any, carbon black reinforcement. Such directed high frequency energy heating is provided, individually, by directed radio frequency (electromagnetic) radiation and/or by directed microwave radiation. Representative examples of such polymers may be, for example, trans 1,4-polybutadiene, 3,4-polyisoprene, natural cis 1,4-polyisoprene rubber, isoprene/butadiene copolymer having a high trans 1,4-polybutadiene component, polystyrene, styrene/butadiene rubber having a high trans 1,4-polybudadiene component and styrene/butadiene rubber having a high styrene content.

12 Claims, 2 Drawing Sheets

PREPARATION OF COMPONENTS AND ARTICLES WITH DIRECTED HIGH FREQUENCY ENERGY HEATED SILICA-RICH RUBBER COMPONENTS CONTAINING HIGH SOFTENING POINT POLYMER AND SULFUR CURATIVE

FIELD OF THE INVENTION

This invention relates to a process of preparation of components and articles of manufacture containing at least one of such components, such as tires, and the resulting prepared components and fabricated articles, by use of directed high frequency energy internally heated silica-rich rubber compositions which contain sulfur curative and a significant content of high softening point polymer, namely a polymer and/or elastomer having a melting point (Tm) and/or high glass transition temperature (Tg) above 0° C., and particularly above 30° C., and which contains a minimal, if any, carbon black reinforcement. Such directed high frequency energy heating is provided, individually, by directed radio frequency (electromagnetic) radiation and/or by directed microwave radiation. Representative examples of such polymers may be, for example, trans 1,4-polybutadiene, 3,4-polyisoprene, natural cis 1,4-polyisoprene rubber, isoprene/butadiene copolymer having a high trans 1,4-polybutadiene component, polystyrene, styrene/butadiene rubber having a high trans 1,4-polybutadiene component and styrene/butadiene rubber having a high styrene content.

BACKGROUND OF THE INVENTION

Efficient processing of pre-mixed rubber compositions to shape and fabricate various components for articles of manufacture and to fabricate such articles themselves is important.

Various pre-mixed rubber compositions may be relatively difficult to process, such as for example by extrusion and calendering operations, if they are relatively stiff, or of a relatively high viscosity, at about room temperature, or about 23° C.

In particular, polymers and elastomers having relatively high softening point (Tm) and high glass transition point (Tg) polymers and rubbers can themselves be relatively stiff and difficult to process at room temperatures and various pre-mixed rubber compositions which contain significant amounts of such polymers and/or elastomers may consequently to relatively difficult to process at room temperature.

Representative examples of such polymers are, for example, trans 1,4-polybutadiene polymer, 3,4-polyisoprene elastomer, isoprene/butadiene copolymers having a high trans 1,4-polybutadiene component, styrene/butadiene copolymer elastomers with high styrene contents, styrene/butadiene copolymer elastomers with high trans 1,4-polybutadiene component, polystyrene and natural cis 1,4-polyisoprene rubber.

For example, trans 1,4-polybutadiene polymers are sometimes used in various rubber compositions such as, for example, various tire components.

For example, a trans 1,4-polybutadiene polymer typically has a relatively high melting point (Tm) above normal room temperature is usually considered to be at least 30° C. and generally in a range of from about 35° C. to about 45° C. The trans 1,4-polybutadiene polymer is relatively solid at room temperature (e.g. 23° C.).

The trans 1,4-polybutadiene polymer also has a relatively high crystallinity content and tends to be a thermoplastic polymer which contains numerous carbon-to-carbon double bonds in its polymeric backbone and can thereby be blended with and sulfur cured with various diene-based elastomers. It tends to become elastomeric when sulfur cured alone or in combination with diene-based elastomers.

Due to its relatively high melting point as well as its thermoplastic nature, the trans 1,4-polybutadiene is normally relatively difficult to process (e.g. mix) in ordinary internal rubber mixers so that it is often desirable to pre-heat the trans 1,4-polybutadiene before mixing it with other diene-based elastomers in the preparation of various rubber compositions for use in the preparation of components for fabricating various articles of manufacture such as, for example, tires.

In practice, the trans 1,4-polybutadiene polymer is often simply pre-heated to a temperature to, for example, at least about 40° C., usually at least about 45° C., to render it more readily processable prior to mixing it with other diene-based elastomers. Such preheating may be accomplished by placing a bale of trans 1,4-polybutadiene in a "hot house" storage room over a period of time of several days. However, during the relatively slow "hot house" heating typically causes the trans 1,4-polybutadiene polymer to undergo oxidative gelation which, in turn, can cause the resulting trans 1,4-polybutadiene to be difficult to process even though it is in a pre-heated state.

Alternatively, the trans 1,4-polybutadiene polymer may be processed in its polymerizate cement state by may be pre-blended the polymerizate with a synthetic cis 1,4-polybutadiene elastomer polymerizate cement and the resulting blend recovered to yield a more processable trans 1,4-polybutadiene polymer, in a form of a masterbatch with the cis 1,4-polyisoprene elastomer, to thereby avoid the slow "hot house" pre-heating treatment of the trans 1,4-polybutadiene polymer. For example, see U.S. Pat. No. 5,753,761.

Alternatively, by rapidly pre-heating the trans 1,4-polybutadiene polymer, particularly when containing an aromatic a rubber processing oil, to a temperature of at least 40° C., and alternately at least about 45° C., via application of radio frequency (electromagnetic) treatment at a frequency in a range of about 2 MHz to about 80 MHz, the trans 1,4-polybutadiene may be rendered processable without an unnecessarily excessive attendant oxidative cross-linking and gelation which may be experienced by the more time consuming "hot house" pre-heating of the trans 1,4-polybutadiene polymer over a period of several days. For example, see U.S. Pat. No. 5,854,351.

In practice, however, in a pre-mixed rubber composition which contains a significant presence of a high melting point (Tm) and/or high glass transition temperature (Tg) polymer and/or elastomer, such as for example, the trans 1,4-polybutadiene, such pre-mixed rubber composition itself may thereby also significantly stiff, or of a significantly high viscosity to render it relatively difficult to process in conventional rubber processing equipment for shaping and fabricating (for example by rubber extruder/die apparatus and textile fabric rubber encapsulating calendering equipment). Accordingly, often only a minimal amount (e.g. perhaps less than about 10 phr) of the trans 1,4-polybutadiene polymer can normally satisfactorily be used in such rubber compositions without incurring processing difficulties in shaping and calendering such relatively stiff (e.g. high viscosity) rubber composition for shaping and fabricating various rubber components for various articles of manufacture such as, for example, tires.

It is therefore desired to provide a process of shaping and fabrication of various components of an article of manufacture of a pre-mixed rubber composition which contains a significant content of polymer and/or elastomer having a Tm or Tg above 0° C. and particularly above 30° C. (particularly and clearly above a room temperature of 23° C.), and particularly including a trans 1,4-polybutadiene polymer and particularly a stiff, or relatively high viscosity rubber composition composed of diene-based elastomer(s) which contains at least 20, and preferably from about 30 to about 80, phr of the high Tm or high Tg polymer or elastomer such as, for example a trans 1,4-polybutadiene polymer.

Thus, it is considered herein that, in general, a problem exists for rubber compositions which contain an appreciable content of the relatively high Tm or high Tg polymer or elastomer, such as for example, a trans 1,4-polybutadiene (e.g. greater that 10 phr and particularly greater than 20 phr, depending somewhat upon the nature and composition of the rubber composition itself), thereby rendering the rubber composition relatively stiff at room temperature (e.g. 25° C.) and difficult to process with conventional rubber processing equipment (e.g. shaping the rubber composition via extrusion of the uncured rubber composition through various shaping dies or calendering onto a textile fabric) to form a component of an article of manufacture such as, for example, a tire. Therefore, it is considered herein that the use of such rubber compositions to shape and/or fabricate various components for articles of manufacture, such as for example tires, which contain a significant content of high Tm or high Tg polymer is significantly limited.

Accordingly, it is an aspect of this invention to provide a process of shaping and/or fabrication of a component of article of manufacture, and the fabrication of the article itself, for example a tire, and thereby providing such component and such article of manufacture, by pre-treating at least one component thereof as a silica-rich diene rubber based rubber composition which contains a sulfur curative and which contains at least 20, alternately from about 30 to about 80, phr of relatively high Tm or high Tg polymer or elastomer, such as for example, trans 1,4-polybutadiene and contains less than about 10 phr, preferably a maximum of about 6 phr, of carbon black by directed high frequency energy heating (e.g. radio frequency or by microwave heating) thereof to a temperature of at least about 40° C., and preferably at least about 45° C., to a maximum of about 90° C. and preferably a maximum of about 75° C., prior the physical processing of the rubber composition to form a rubber component for fabrication of an article of manufacture which contains such component. Preferably such preheated temperature range is maintained subsequent to said pre-heating and until the article is fabricated (e.g. the temperature of the rubber composition is preferably not allowed to drop below 40° C., preferably not drop below 45° C.).

In the description of this invention, the term "phr" refers to parts by weight of an ingredient per 100 parts by weight of both the diene-based elastomer(s), as well as a high Tm or high Tg polymer or elastomer, such as for example, a trans 1,4-polybutadiene polymer when it is used, to be included in a rubber composition.

The softening point (Tm) and glass transition temperature (Tg) of a polymer or elastomer may be determined by differential scanning calorimeter means (DSC), a method of determining a Tm or Tg of a polymer well known to those having skill in such art, at a heating rate of 10° C. per minute (ASTM D3418-99)

The terms "elastomer" and "rubber" may be used interchangeably unless otherwise indicated. The terms "cured" and "vulcanized" where used, may be used interchangeably, unless otherwise indicated.

SUMMARY AND PRACTICE OF THE INVENTION

In accordance with this invention, a process of providing a rubber composition for a component of an article of manufacture (e.g. a tire) comprises applying a directed high frequency energy to an unvulcanized, silica-rich diene-based rubber composition which contains at least one polymer and/or elastomer having a melting point (Tm) or glass transition temperature (Tg) of at least 0° C., alternately at least about 30° C., and sulfur curative, wherein said rubber composition has a temperature below 35° C., in at least one directed energy station to thereby internally preheat the rubber composition by directed high frequency energy to a temperature of at least about 40° C. and preferably at least to about 45° C. and a maximum of about 90° C. and preferably a maximum of about 75° C.;

wherein said directed high frequency energy is applied to said rubber composition within said directed energy station(s) by at least one radio frequency radiation directed energy station by application of radio frequency in a range of from about 0.5 to about 100, alternately from about 2 to about 80, MHz and/or at least one microwave frequency radiation directed energy station by application of microwave frequency in a range of from about 900 to about 930 or from about 2300 to about 2600 MHz;

wherein said diene-based rubber composition is comprised of, based upon parts by weight per 100 parts by weight to the total of diene-based elastomer(s) and said high Tm and/or high Tg polymer and/or elastomer (phr):

(A) at least about 20, and alternately from about 30 to about 80, alternatively about 40 to about 60, phr of at least one polymer and/or elastomer having a Tm or Tg of least about 0° C., alternately at least about 30° C.;

(B) at least 20 phr of at least one diene-based elastomer having a Tm or Tg of less than 0° C., (C) a dispersion throughout said rubber composition of about 40 to about 80, alternately about 45 to about 65, phr of particulate reinforcement therefor composed of
  (1) about 35 to about 75, alternately about 36 to about 74, phr of synthetic precipitated silica,
  (2) from zero to about 10, alternately about 4 to about 6, phr of rubber reinforcing carbon black, and
  (3) from zero to about 30, alternately about 0.2 to about 15, phr of at least partially exfoliated intercalated clay platelets,
  (4) about 0.1 to about 4 phr of sulfur, and optionally,
  (5) from about 10 to about 40 phr of aromatic rubber processing oil.

It is a significant aspect of this invention that a directed high frequency energy application is used to heat the rubber composition. This is intended to differentiate application of simple radiant heat from a heat generating source such as, for example, external heating by infrared heat, steam heat and electrical heat. This is considered to be significant because, by using the directed high frequency generated heat, the elevated temperature is generated in a more efficient manner within the rubber composition itself instead of a more simple application of heat to the external surface of the rubber composition.

In practice, said polymer and/or elastomer having a Tm or Tg of at least 0° C., alternately at least about 30° C., and alternately in a range of from about 0° C. to about 110° C., may be, for example, thermoplastic trans 1,4-polybutadiene polymer (having a Tm, for example, in a range of from about 30° C. to about 45° C.), 3,4-polyisoprene elastomer (having a Tg, for example, of from about −10° C. to about +30° C. depending largely upon its 3,4-content), styrene/butadiene copolymer elastomer having a styrene content of at least about 30 percent (having a Tg, for example, of at least about 10° C., although in one respect depending somewhat upon its styrene content), styrene/butadiene copolymer elastomer with a polybutadiene component having a trans 1,4-content of at least about 70 percent (which may have a Tg, for example of about −79° C., although in one respect depending somewhat upon the trans 1,4-content), isoprene/butadiene copolymer with a polybutadiene component having a trans 1,4-content of at least about 70 percent (having a Tg depending somewhat upon the trans 1,4-content of its polybutadiene component), natural cis 1,4-polyisoprene rubber (having a Tg, for example of about −60° C. but a Tm above about 0° C., depending largely upon the grade or purity of the natural rubber) and polystyrene polymer (which may have a Tg, for example, of about 100° C. which may depend largely upon the molecular weight and degree of crystallinity of the polystyrene), so long as said polymer and/or elastomer has a Tm or Tg of at least about 0° C. (alternately above about 30° C. and alternately in a range of from about 0° C. to about 110° C.), a facet which can readily be determined by one having skill in such art by routine examination without undue experimentation.

However, in general, elastomers having a Tm or Tg above 0° C. are contemplated as including polymers of at least one of isoprene and 1,3-butadiene and copolymers of styrene and/or a alphamethylstyrene with at least one of isoprene and 1,3-butadiene so long as it has a Tm or Tg above 0° C.

Whether a polymer or elastomer has a melting point (Tm) may be largely dependent upon whether it has a significant degree or type of crystallinity as it is believed to be well known to those having skill in such art and that such melting point (Tm) is virtually significantly higher than its glass transition temperature (Tg).

It is important to appreciate that a polymer and/or elastomer may have a Tg lower than 0° C., and if it has a Tm, it may have a Tm above 0° C.

For example, a rubber composition may be composed of entirely natural cis 1,4-polyisoprene rubber (100 phr) which may have a Tg of perhaps about −60° C. and a Tm of perhaps about +5° C., depending upon its grade and purity, which therefore satisfies the requirements of this invention, namely that the rubber composition is comprised of at least 20 phr of elastomer having a Tg or Tm above 0° C. and at least 20 phr of an elastomer having a Tg or Tm lower than 0° C.

It is considered herein that the process of this invention is particularly adaptable to the use of thermoplastic trans 1,4-polybutadiene having a Tm in a range of from about 30° C. to about 45° C. Therefore, a primary portion of the description of the invention is directed to the processing of rubber compositions which contain a significant thermoplastic trans 1,4-polybutadiene content. However, this is not intended to diminish the use of the process of this invention for rubber compositions which contain a significant content of polymers and/or elastomers which have a Tm or Tg of at least about 0° C. and particularly at least about 30° C. and particularly the aforesaid identified polymers and elastomers.

While it is appreciated that some of the above mentioned polymers and elastomers have, for example, a Tm or Tg of at least about 0° C., and which may therefore be below normal room temperature (e.g. 23° C.) they are nevertheless considered herein as adding sufficient stiffness, or viscosity, to the rubber composition at about room temperature (e.g. 23° C.) to cause the rubber composition to be more difficult to process and therefore adaptable to the process of this invention.

In further accordance with this invention a process of providing a rubber composition for a component of an article of manufacture (e.g. a tire) comprises applying a directed high frequency energy to an unvulcanized, silica-rich diene-based rubber composition which contains a trans 1,4-polybutadiene polymer, wherein said rubber composition has a temperature below 35° C., alternately in a range of from 20° C. to about 30° C., and has a G' storage modulus at 30° C. of at least 800, alternately at least 1100, kPa, alternately in a range of from about 800 kPa to about 1200 kPa, in at least one directed high frequency energy station to thereby internally preheat the rubber composition by directed energy to a temperature of at least about 40° C. and preferably at least to about 45° C. and a maximum of about 90° C. and preferably a maximum of about 75° C., to thereby reduce the G' Storage Modulus of said rubber composition to less than about 600 kPa and alternatively in a range of from about 100 kPa to about 500 kPa;

wherein said directed high frequency energy is applied to said rubber composition within said directed energy station(s) by at least one radio frequency radiation directed energy station by application of radio frequency in a range of from about 0.5 to about 100, alternately from about 2 to about 80, MHz and/or at least one microwave frequency radiation directed energy station by application of microwave frequency in a range of from about 900 to about 930 or from about 2300 to about 2600 MHz;

wherein said diene-based rubber composition is comprised of, based upon parts by weight per 100 parts by weight to the total of diene-based elastomer(s) and said trans 1,4-polybutadiene polymer (phr):

(A) at least about 20, and preferably from about 30 to about 80, alternatively about 40 to about 60, phr of a thermoplastic trans 1,4-polybutadiene polymer having a trans 1,4-content of at least 70, alternately at least 80, percent and a melting point in a range of about 35° C. to about 45° C., alternately about 35 to about 40° C. (ASTM D3418-99), (B) at least one diene-based elastomer, (C) a dispersion throughout said rubber composition of about 40 to about 80, alternately about 45 to about 65, phr of particulate reinforcement therefor composed of (1) about 35 to about 75, alternately about 36 to about 74, phr of synthetic precipitated silica, (2) from zero to about 10, alternately about 4 to about 6, phr of rubber reinforcing carbon black, and (3) from zero to about 30, alternately from about 0.2 to about 15, phr of at least partially exfoliated, intercalated, clay platelets, (D) about 0.1 to about 4 phr of sulfur, and optionally, (E) from about 10 to about 40 phr of aromatic rubber processing oil.

In the practice of this invention, said rubber composition may be pre-heated by passing it through:

(A) at least one directed high frequency energy station in which radio frequency energy is applied to said rubber composition at a frequency in a range of about 0.5 to about 100, alternately from about 2 to about 80, MHz, or (B) at least one directed high frequency energy station in which microwave frequency energy is applied to said rubber composition at a frequency in a range of about 900 to about 930 or from about 2300 to about 2600 MHz, or (C) a combination of:
(1) least one directed high frequency energy station in which radio frequency energy is applied to said rubber composition at a frequency in a range of about 0.5 to about 100, alternately about 2 to about 80, MHz, and
(2) at least one directed high frequency energy station in which microwave frequency energy is applied to said rubber composition at a frequency in a range of about 900 to about 930 or about 2300 to about 2600 MHz, or (D) a sequential combination of:
(1) a first directed high frequency energy station in which radio frequency energy is applied to said rubber composition at a frequency in a range of about 0.5 to about 100, alternately about 2 to about 80, MHz followed by:
(2) a subsequent directed high frequency energy station in which microwave frequency energy is applied to said rubber composition at a frequency in a range of about 900 to about 930 or about 2300 to about 2600 MHz.

In an additional practice of this invention, said process further comprises processing said rubber composition while maintaining the temperature thereof at or above said directed high frequency energy induced temperature of at least 40° C., and alternatively at least 45° C., (without allowing the temperature of the rubber composition to fall below its directed energy generated temperature of at least 40° C., alternatively not below 45° C.) by extruding said rubber composition in an extruder through a rigid die opening to thereby shape said extruded rubber composition into shaped, unvulcanized rubber component, building said shaped component into an unvulcanized tire assembly, followed by molding said tire assembly in a suitable mold at a temperature of about 140° C. to about 160° C. to shape and vulcanize said tire assembly to form a pneumatic tire.

In a further practice of this invention, said process further comprises processing said rubber composition while maintaining the temperature thereof at or above said directed high frequency energy induced temperature of at least 40° C., and alternatively at least 45° C., (without allowing the temperature of the rubber composition to fall below its directed energy generated temperature of at least 40° C., alternatively not below 45° C.) by:

(A) extruding said rubber composition in an extruder through a rigid die opening to thereby shape said extruded rubber composition into an elongated contoured tread strip having a contoured cross-section, building said contoured tread strip into an unvulcanized tire assembly, followed by molding said tire assembly in a suitable mold at a temperature of about 140° C. to about 160° C. to shape and vulcanize said tire assembly including said contoured tread strip to form a pneumatic tire having a circumferential running surface as a tread comprised of said vulcanized tread strip, or (B) calendering said rubber composition onto a textile fabric of tire cords by passing said rubber composition and textile fabric between two opposing cylindrical rigid rolls, said rolls revolving in opposite rotational directions to each, other to thereby pull the fabric and rubber composition therebetween and form a ply comprised of said fabric encompassed by said rubber composition, building said ply into an unvulcanized tire assembly wherein said ply extends from bead-to-bead through a crown portion of said tire assembly, followed by molding said tire assembly in a suitable mold at a temperature of about 140° C. to about 160° C. to shape and vulcanize said tire assembly to form a pneumatic tire, or (C) extruding said rubber composition in an extruder through a rigid die opening to thereby shape said extruded rubber composition into a contoured elongated sidewall insert strip having a contoured cross-section, building said contoured sidewall strip into a sidewall of an unvulcanized tire assembly, followed by molding said tire assembly in a suitable mold at a temperature of about 140° C. to about 160° C. to shape and vulcanize said tire assembly including said contoured sidewall strip to form a pneumatic tire having sidewall strip as an insert component of the tire positioned within the tire sidewall, wherein (1) said sidewall strip is an annular strip in a from of an apex component of the tire of which its contoured cross-section extends radially outward from a bead component of the tire into a sidewall of said tire, or
(2) said sidewall strip is an annular strip in a form of a sidewall insert component of the tire positioned within a sidewall of said tire and spaced apart from a tire bead component of said tire.

In an additional practice of the process of this invention, said rubber composition contains a dispersion therein of from about 10 to about 40 phr of aromatic rubber processing oil.

Therefore, in one aspect, said rubber composition preferably also contains a dispersion therein of aromatic rubber processing oil. Such rubber processing oil may be comprised of, for example, about 20 to about 50 percent of aromatic content, about 10 to about 40 weight percent naphthenic content and bout 20 to about 50 weight percent. Accordingly, such rubber processing oil may have an aromaticity content of about 30 to about 50 weight percent, a naphthenic content in a range of about 10 to about 40 weight percent and a paraffinic content in a range of from about 20 to about 50 weight percent. A preferred processing oil for utilization in the process of this invention may contain about 35 percent to 45 weight percent aromatic oils, about 15 percent to 30 weight percent naphthenic oils and 25 percent to 45 percent weight paraffinic oils.

Therefore, a further aspect of this invention is an inclusion of the aromatic rubber processing oil in the rubber composition, which is considered herein to assist the internal heating of the rubber composition by the directed high frequency energy heating by said radio frequency and/or microwave frequency treatment.

One aspect of this invention is the directed high frequency energy treatment of a diene-based rubber composition having a high G' storage modulus which, in turn contains at least 20, alternately at least about 30, phr of a relatively crystalline and relatively thermoplastic trans 1,4-polybutadiene polymer, which renders the rubber composition relatively difficult to process because of its inherent relatively high stiffness as reflected by a relatively high G' storage modulus at room temperature (e.g. about 23° C.). Indeed, the stiffness property of the rubber composition is referred to herein in terms of its G' storage modulus instead of a Mooney viscosity because its viscosity at room temperature is considered herein to be too great to be readily determined by Mooney viscosity means at room temperature.

It is to be appreciated that the trans 1,4-polybutadiene polymer may be oil extended by addition of the oil to the trans 1,4-polybutadiene polymer prior to its addition to the rubber composition.

In practice, as hereinbefore discussed, by the directed energy heating used in this the process of this invention, the rubber composition containing the significant trans 1,4-polybutadiene polymer content can normally be rapidly heated to a temperature of at least 40° C. in a matter of minutes. The intensity and duration of the treatment can be readily be adjusted by one having skill in such art without undue experimentation. During this rapid heating process it is contemplated herein that oxidative gelation of the trans 1,4-polybutadiene polymer does not occur to a significant degree. This is, of course, in contrast to conventional heating techniques where trans 1,4-polybutadiene polymer by itself is slowly warmed by convection heating to the required temperature over a period of days.

Representative diene-based elastomers for the rubber composition of this invention which may have a Tm or Tg of lower than 0° C., are selected from, for example, polymers and copolymers of at least one of isoprene and 1,3-butadiene and copolymers of styrene and/or alpha methylstyrene with at least one of isoprene and 1,3-butadiene. Representative of such elastomers are, for example, cis 1,4-polyisoprene, cis 1,4-polybutadiene, styrene/butadiene copolymers, isoprene/butadiene copolymers, 3,4-polyisoprene and styrene/isoprene/butadiene terpolymers, so long as such elastomer has a Tm or Tg lower than 0° C., a facet which can be readily determined by one having skill in such art by routine examination without undue experimentation.

The trans 1,4-polybutadiene polymer for use in the process of this invention can be synthesized utilizing known techniques and the following discussion relates to various methods of preparation of trans 1,4-polybutadiene polymer.

For example, the trans 1,4-polybutadiene polymer may be synthesized by solution polymerization utilizing the procedure described in U.S. Pat. No. 5,089,574, employing a catalyst system which is comprised of an organocobalt compound, an organoaluminum compound, a para-substituted phenol and carbon disulfide. The molecular weight of the trans 1,4-polybutadiene polymer may be controlled, for example, by utilizing a molecular weight regulator selected from the group consisting of dialkyl sulfoxides, diaryl sulfoxides and dialkaryl sulfoxides as described in U.S. Pat. No. 5,448,002. The teachings of U.S. Pat. No. 5,089,574 and U.S. Pat. No. 5,448,002 are incorporated herein by reference in their entirety.

The microstructure of the trans 1,4-polybutadiene polymer varies with the monomer concentration utilized in its synthesis. Lower 1,3-butadiene monomer concentrations in the polymerization medium tends to result in higher trans contents of the resulting polymer. As the concentration of 1,3-butadiene monomer in the polymerization medium is increased, the level of trans-1,4 structure in the polymer decreases. For instance, at a 1,3-butadiene monomer concentration of 5 weight percent, trans contents of about 84 percent are typical. At monomer concentrations of 17 percent, trans contents of about 80 percent are typical. In cases where the polymerization medium contains about 30 weight percent monomer, TPBD having a trans content of only about 68 percent is generally produced. Thus, the trans content of the microstructure of the trans 1,4-polybutadiene polymer can vary according the 1,3-butadiene monomer content for the polymerization, but will normally be greater than about 65 percent. In practice, it is considered herein that the trans-isomer content of the microstructure of the trans 1,4-polybutadiene polymer will preferably be greater than about 75 percent and will more preferably be greater than about 80 percent.

It is believed to be important for the rubber composition which contains the trans 1,4-polybutadiene polymer to be heated to a temperature of at least 40° C. and preferably to at least 45° C. Since the microwave radiation warms the rubber component from the inside to the outside, it is believed to be important for the rubber component have an outer surface temperature of at least 40° C. when using microwave radiation for the directed energy.

It is important to process the rubber composition which contains the trans 1,4-polybutadiene polymer before its temperature falls below 40° C., preferably before it falls below 45° C. when it is pre-heated to a temperature of at least 45° C. In other words, the rubber composition should not be allowed to cool below the desired temperature range before it is processed. Thus, the rubber composition will normally be heated with the directed energy practically immediately before it is processed so that it will not have time to cool below of the desired temperature range. In practice, it is therefore considered herein to be normally advantageous for the directed energy station(s) to be located in close proximity to the rubber processor being utilized.

It is readily appreciated by those having skill in the art that the rubber composition would be compounded by methods generally known in the rubber compounding art, such as mixing the aforesaid various diene-based sulfur-vulcanizable constituent rubbers and polymers with various commonly used additive materials such as, for example, curing aids, such as the aforesaid sulfur curative, as well as sulfur vulcanization activators, retarders and accelerators, processing additives, resins including tackifying resins, and plasticizers, fillers, pigments, fatty acid, zinc oxide, waxes, antioxidants and antiozonants and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 20 phr. Such processing aids are intended to exclude, or at least substantially exclude aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur.

Vulcanization accelerators (and retarders) are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amount (0.5 to 2 phr), and a secondary accelerator which is generally used in smaller amounts (0.05 to 0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention unless otherwise indicated.

Sometimes one or more of the antioxidants and antiozonants may be more simply referred to as antidegradants.

The rubber reinforcing carbon blacks may be, for example, one or more carbon blacks illustrated in the *Vanderbilt Rubber Handbook* (1978), Pages 414 through 418. Use of such rubber reinforcing carbon blacks is well known to those having skill in such art.

The silica reinforcement is typically particulate aggregates of amorphous precipitated silica. Use of such amorphous silicas is well known to those having skill in such art. For this invention, chemically pre-treated silicas are intended to be included if desired.

The use of at least partially exfoliated, intercalated clay platelet reinforcement is believed to be known to those having skill in such art. Such platelets may be in a form, for example, of a water swellable clay (e.g. a smectite clay such as, for example, a montmorillonite clay, which has been swelled with water to expand the galleries between the platelets of the clay, intercalated with a quaternary ammonium salt to cause an ion exchange within the expanded galleries and to further expand the galleries and to eventually effect an at least partially exfoliate the platelets into individual platelets in which the recovered (dried) at least partially exfoliated, intercalated clay platelets are considered as contributing to the reinforcement of the rubber composition.

A coupling agent is typically used with the amorphous silica reinforcement as is well known to those having skill in the art and may also used in conjunction with the aforesaid exfoliated clay platelets.

Representative of such coupling agent is, for example, a bis(3-triethoxysilylpropyl)polysulfide having an average of from 2 to 4, alternately an average of from 2 to 2.6 or an average of from 3.5 to 4, connecting sulfur atoms in its polysulfidic bridge.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE I

Rubber compositions were prepared which were composed of natural rubber together with cis 1,4-polybutadiene rubber or trans 1,4-polybutadiene rubber and identified herein as Control Sample A and Sample B, respectively.

The rubber compositions were prepared in an internal rubber mixer using several mixing stages, namely, three non-productive mix stage(s), in which ingredients are mixed, except for sulfur curative and vulcanization accelerator, for about two minutes for each non-productive mixing stage to a temperature of about 155° C. for each non-productive mixing stage, dumped from the mixer, sheeted out and allowed to cool to below 40° C.

The resulting rubber compositions were then mixed in a productive mixing stage in an internal rubber mixer, in which sulfur curative and accelerator are added, for a period of about three minutes to a temperature of about 100° C.

For preparation of Sample B, the relatively stiff trans 1,4-polybutadiene polymer had been pre-heated via radio frequency directed energy heating (e.g. a frequency of about 2 to about 80 megahertz instead of by microwave radiation heating) to a temperature of about 40° C. to about 45° C.

Mixing rubber compositions in sequential non-productive and productive mixing stages is well known to those having skill in such art.

The formulations for Control Sample A and Sample B are shown in the following Table 1 in terms of parts per 100 parts of materials with the parts by weight of natural rubber and cis 1,4-polybutadiene rubber, and trans 1,4-polybutadiene polymer where used, adding up to a value of 100.

TABLE 1

| Material | Control Sample A | Sample B |
| --- | --- | --- |
| First Non-Productive Mix Stage (to about 155° C.) | | |
| Cis 1,4-polybutadiene rubber[1] | 60 | 0 |
| Trans 1,4-polybutadiene polymer[2] | 0 | 60 |
| Natural rubber (NR)[3] | 40 | 40 |
| Silica[4] | 50 | 50 |
| Aromatic rubber processing oil[5] | 20 | 20 |
| Antidegradant[6] | 2 | 2 |
| Fatty acid[7] | 2 | 2 |
| Zinc oxide | 3 | 3 |
| Microcrystalline wax | 1 | 1 |
| Coupling agent[8] | 8 | 8 |
| Second Non-Productive Mix Stage (to about 155° C.) | | |
| No additional ingredients added Productive Mix Stage (to about 100° C.) | | |
| Sulfur | 1.5 | 1.5 |
| Accelerator, sulfenamide type | 1 | 1 |

[1] Obtained as Budene 1207 ™ from The Goodyear Tire & Rubber Company
[2] Trans 1,4-polybutadiene, having a trans 1,4-content of about 84 percent and a melting point of about 38° C. (differential scanning calorimeter (ASTM D3418-99)), obtained from The Goodyear Tire & Rubber Company
[3] Cis 1,4-polyisoprene natural rubber
[4] Obtained as Zeosil1165 ™ from the Rhodia Company
[5] High aromatic rubber processing oil
[6] Of the polyphenylene diamine type
[7] Primarily stearic acid
[8] Bis(3-triethoxysilylpropyl) tetrasulfide as Si69 ™ from the Degussa Company as a composite thereof with carbon black in a 50/50 weight ratio (thus 4 parts of the coupling agent and 4 parts carbon black).

EXAMPLE II

A temperature sweep was made by an RPA analytical instrument on each of the uncured rubber Samples prepared in Example I from about 40° C. to about 140° C. and the G' (dynamic storage modulus) noted at different temperatures of the rubber Samples.

The RPA instrument was a Rubber Process Analyzer as RPA 2000™ instrument by Alpha Technologies, formerly the Flexysis Company and formerly the Monsanto Company. References to an RPA 2000 instrument may be found in the following publications: H. A. Palowski, et al, *Rubber World*, June 1992 and January 1997, as well as *Rubber & Plastics News*, Apr. 26 and May 10, 1993.

The temperature sweep results are shown in the following Table 2 in terms of temperature (° C.) versus G' Storage Modulus (kPa).

TABLE 2

(Temperature Sweep)

| | G' (kPa) | |
|---|---|---|
| Temperature (° C.)[1] | Control Sample A | Sample B |
| 40 | 733 | 1059 |
| 50 | 676 | 936 |
| 60 | 610 | 818 |
| 70 | 555 | 726 |
| 80 | 509 | 647 |
| 90 | 467 | 573 |
| 100 | 433 | 518 |
| 110 | 407 | 674 |
| 120 | 379 | 425 |
| 130 | 345 | 375 |
| 140 | 303 | 330 |

[1]Note that the RPA analysis of the Samples was begun at a higher temperature 140° C. and the analysis administered as the Sample cooled instead of beginning at 40° C. because of the difficulty of processing the Sample at the lower temperature. It is recognized that 40° C. is above a more normal room temperature of about 23° C. It can be readily envisioned that the G' storage modulus of the Sample B at 23° C. would be well above the reported value of 1059 kPa for the 40° C. in Table 1.

From Table 2 a great disparity is shown between the G' storage modulus of the Sample B of about 1059 kPa at about 40° C. (containing a significant trans 1,4-polybutadine polymer content) and the G' storage of the Control Sample A of about 733 kPa at about 40° C. (which does not contain the trans 1,4-polybutadiene polymer). This is indicative of a significant difference in ability to process the respective rubber compositions with Sample B being clearly more difficult than Control Sample A to process at 40° C. because of its significantly higher modulus although it is believed that Sample B could be reasonably processed at 40° C. The data is clearly indicative that the difference in G' storage modulus of Control Sample A and Sample B for the respective Samples at room temperature (e.g. about 23° C.) will be significantly greater with the rubber composition of Sample B being significantly more difficult to process.

On a practical basis, as hereinbefore discussed, it is desired, in practice, for the rubber composition of Sample B, which contains the sulfur curative, to be maintained in a temperature range below a maximum about 90° C. and preferably at a temperature below a maximum of about 75° C.

Figure 1:
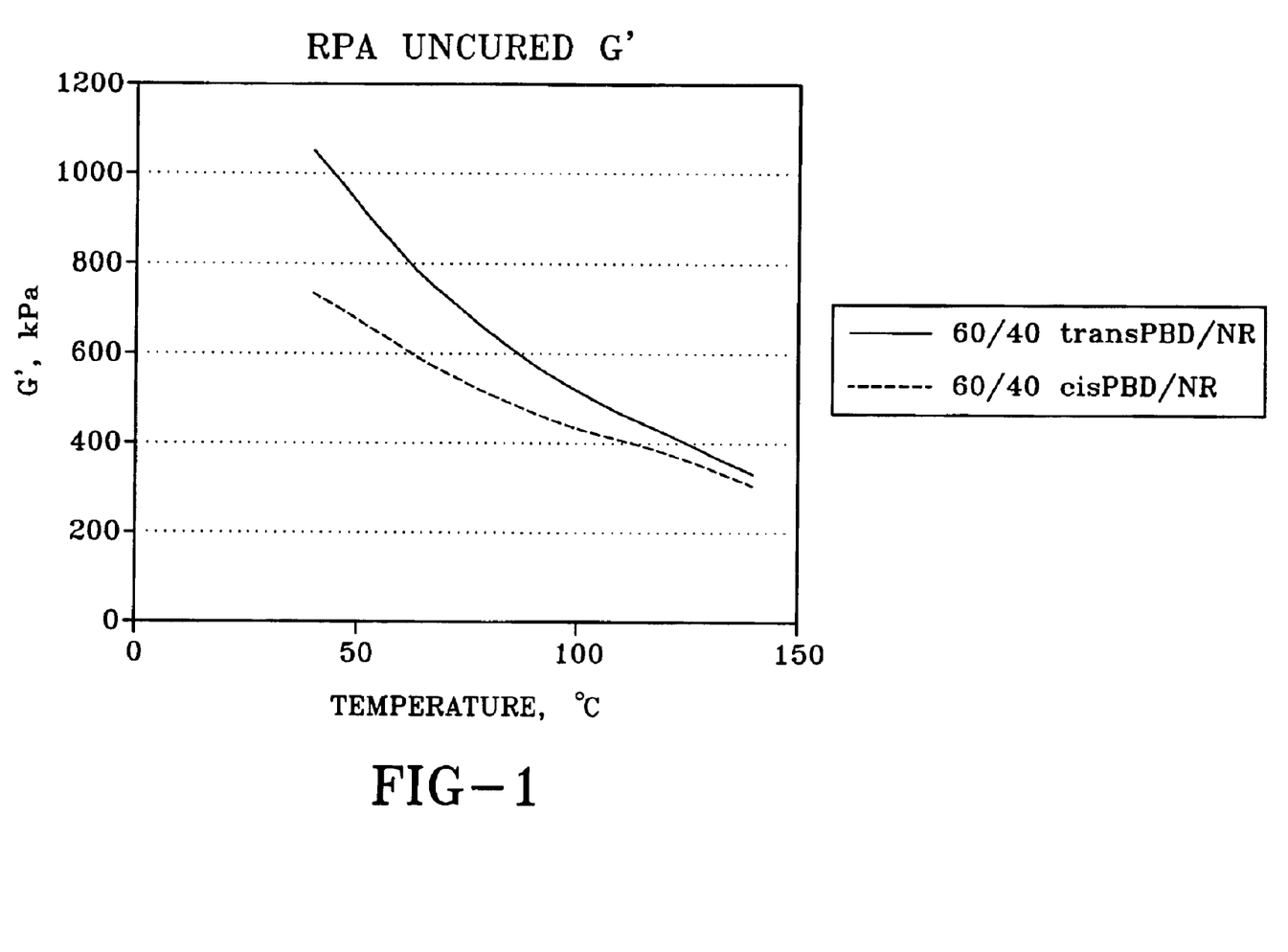
FIG. 1 is provided to more fully illustrate the stiffness, or G' Storage Modulus, differences between the Control Sample A with the 60/40 cis 1,4-polybutadiene rubber/NR and Sample B with the 60/40 trans 1,4-polybutadiene polymer/NR.

FIG. 1 of the Drawings

Inspection of Table 2 of the Example II herein, taken with a view of FIG. 1, illustrates that at 40° C. the Storage Modulus G' of Control Sample A was about 733 kPa and of Sample B was about 1059 kPa for a difference of at least 300 kPa. Thus, at 40° C., the stiffness, or Storage Modulus G', of Sample B which contained the trans 1,4-polybutadene polymer was significantly greater than that of the Control Sample A which contained the more conventional cis 1,4-polybutadiene rubber and is considered herein to be somewhat considerable more difficult to process than the rubber composition of Control Sample A although relatively processable as compared to its envisioned significantly higher G' storage modulus at room temperature, or at about 23° C.

Inspection of Table 2 of the Example II, taken with a view of FIG. 1, further illustrates that, as the temperature of the Control Sample A and of Sample B increases, the difference in the Storage Modulus G' narrows until at a temperature of about 70° C., the difference of the Storage Modulus G' of Control Sample A and Sample B are 726 kPa and 555 kPa, respectively, significantly narrows. In particular, the 726 kPa of Sample B more closely approximates the more workable 733 kPa G' modulus of Control Sample A at 40° C.

Further inspection of Table 2 of the Example II, taken with a view of FIG. 1 further illustrates that, as the temperature of the Control Sample A and of Sample B increases, the difference in the Storage Modulus G' narrows until at a temperature of about 70° C., the Storage Modulus G' of Control Sample A and Sample B are 726 kPa and 555 kPa, respectively, continues to narrow. In particular, the 573 kPa G' modulus of the Sample B at 90° C. is significantly less than workable 733 kPa G' modulus of Control Sample A at 40° C.

EXAMPLE III

A sample of a rubber composition corresponding to Sample B of Example I, and referred to in this Example as Sample B1, which contains the trans 1,4-polybutadiene polymer, is individually heated by radio frequency radiation and by microwave radiation and from a temperature of less than 30° C. to a temperature of about 50° C.

The rubber Sample B1, while still of a temperature of about 45° C., is fed into an extruder which extrudes the Sample B1 through a die to form a shaped, contoured, rubber strip to be applied as a tread component of a green, unvulcanized tire assembly. The assembly is then placed in a suitable mold and the tire further shaped and vulcanized therein at a temperature of about 150° C. to form a pneumatic tire.

An additional rubber Sample B1 is prepared and heated by microwave radiation to a temperature of about 50° C.

The additional Sample B1, while still of a temperature of about 45° C. is fed between two opposing cylindrical rolls rotating in opposite directions, together with a textile fabric of rubber cords, to form a calendered rubber fabric suitable for a tire carcass ply.

The formed calendered fabric is used to form a carcass ply of a green, unvulcanized tire assembly which extends from bead-to-bead of the tire through its crown region. The tire assembly is then placed in a suitable mold and tire further shaped and vulcanized therein at a temperature of about 150° C. to form a pneumatic tire.

Figure 2:
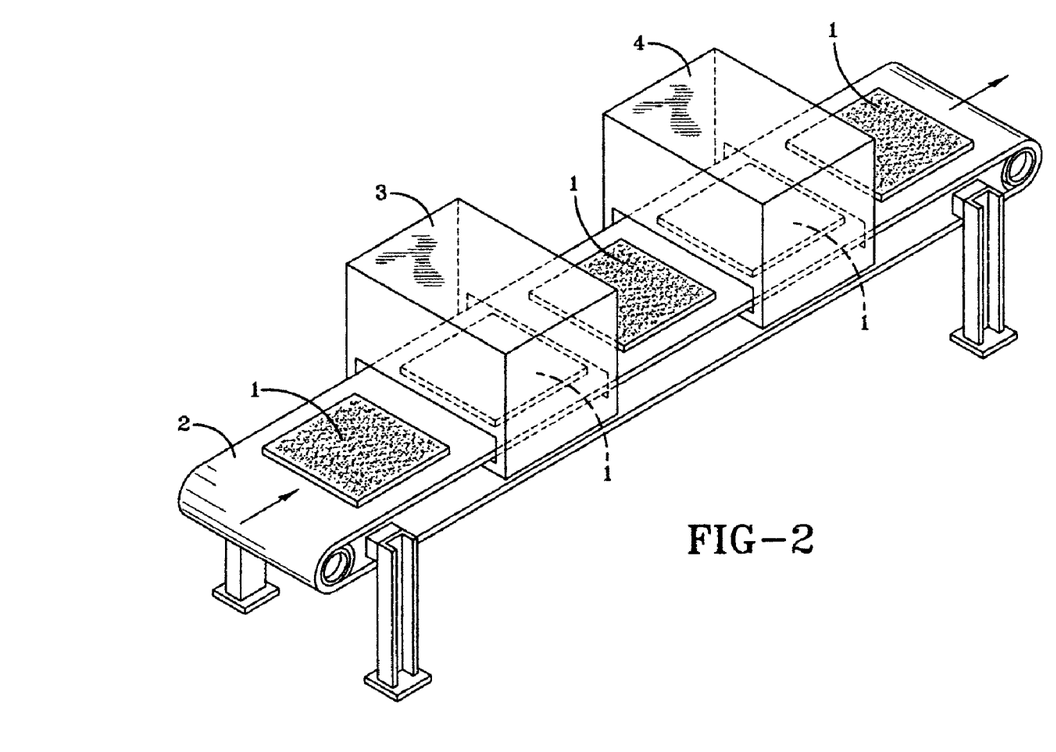
FIG. 2 is provided to illustrate a process of heating a rubber composition which contains trans 1,4-polybutadiene polymer by feeding the rubber composition on a conveyor through at least one directed energy station.

FIG. 2 of the Drawings

Inspection of FIG. 2 shows a rubber composition (1) which is comprised of 40 parts (phr) of natural cis 1,4-polyisoprene rubber and 60 parts (phr) of cis 1,4-polybutadiene polymer (for a total of 100 parts of the rubber and polymer) positioned on an endless conveyor belt (2) and fed through directed energy station (3) and/or directed energy station (4) in which directed energy station (3) is radio frequency radiation application chamber and directed energy station (4) is a microwave radiation chamber, within which the rubber composition (1) is heated from a temperature of about 23° C. to a temperature of about 50° C. whereby its G' Storage Modulus is reduced to a more readily processable value of about 936 kPa (Examples I and II herein). The heated rubber composition (1) is then ready to be fed into a suitable extruder for extrusion though a suitable die (not shown herein) to form a shaped rubber strip suitable as an unvulcanized tire tread for application to a tire assembly.

While certain representative embodiments and details have been shown for the purpose of illustrating the present invention, it will be apparent to those skilled in this art that various changes and modifications can be made therein without departing from the scope of the present invention.

What is claimed is:

1. A process of providing a rubber composition for a component of an article of manufacture (e.g. a tire) comprises applying a directed high frequency energy to an unvulcanized, silica-rich diene-based rubber composition which contains at least one polymer and/or elastomer having a Tm or Tg of at least 0° C., and sulfur curative, wherein said rubber composition has a temperature below 35° C., in at least one directed high frequency energy station to thereby internally preheat the rubber composition by directed high frequency energy to a temperature of at least about 40° C. and a maximum of about 90° C.;

wherein said directed high frequency energy is applied to said rubber composition within said directed energy station(s) by at least one radio frequency radiation directed energy station by application of radio frequency in a range of from about 0.5 to about 100 MHz and/or at least one microwave frequency radiation directed energy station by application of microwave frequency in a range of from about 900 to about 930 or from about 2300 to about 2600 MHz;

wherein said diene-based rubber composition is comprised of, based upon parts by weight per 100 parts by weight to the total of diene-based elastomer(s) and said polymer and/or elastomer having a Tm or Tg of at least 0° C. (phr):

(A) at least about 20 phr of a polymer or elastomer having a Tm or Tg of least 0° C., (B) at least about 20 phr of at least one diene-based elastomer having a Tm or Tg lower than 0° C., (C) a dispersion throughout said rubber composition of about 40 to about 80 phr of particulate reinforcement therefor composed of (1) about 30 to about 75 phr of synthetic precipitated silica, (2) from zero to about 10 phr of rubber reinforcing carbon black, and (3) from zero to about 30 phr of at least partially exfoliated, intercalated clay platelets, (4) about 0.1 to about 4 phr of sulfur, and optionally (5) about 10 to about 40 phr of rubber processing oil.

wherein said polymer and/or elastomer having a Tm or Tg of at least 0° C. is comprised of at least one of trans 1,4polybutadiene-polymer, 3,4-polyisoprene elastomer, styrene/butadiene copolymer elastomer having a styrene content of at least about 30 percent, styrene/butadiene copolymer elastomer with a polybutadiene component having trans 1,4 content of at least about 70 percent, isoprene/butadiene copolymer with a polybutadiene component having a trans 1,4 content of at least about 70 percent, natural cis 1,4-polyisoprene rubber and polystyrene polymer so long as said polymer and/or elastomer has a Tm or Tg of at least 0° C.

2. The process of claim 1 wherein said polymer and/or elastomer having a Tm or Tg of at least 0° C. is a thermoplastic trans 1,4-polybutadiene polymer having a melting point (Tm) in a range of about 30° C. to about 45° C.

3. A process of providing a rubber composition for a component of an article of manufacture comprises applying a directed high frequency energy to an unvulcanized, silica-rich diene-based rubber composition which contains a thermoplastic trans 1,4-polybutadiene polymer having a softening point (Tm) in a range of about 30° C. to about 45° C., wherein said rubber composition has a temperature below 35° C. and has a G' storage modulus at 30° C. of at least 800 kPa, in at least one directed high frequency energy station to thereby internally preheat the rubber composition by directed high frequency energy to a temperature of at least about 40° C. and a maximum of about 90° C., to thereby reduce the G' Storage Modulus of said rubber composition to less than about 600 kPa;

wherein said directed high frequency energy is applied to said rubber composition within said directed energy station(s) by at least one radio frequency radiation directed energy station by application of radio frequency in a range of from about 0.5 to about 100 MHz and/or at least one microwave frequency radiation directed energy station by application of microwave frequency in a range of from about 900 to about 930 or from about 2300 to about 2600 MHz;

wherein said diene-based rubber composition is comprised of, based upon parts by weight per 100 parts by weight to the total of diene-based elastomer(s) and said polymer and/or elastomer having a Tm or Tg of at least 0° C. (phr):

(A) at least about 20 phr of a at least one polymer and/or elastomer having a Tm or Tg of at least 0° C., (B) at least about 20 phr of at least one diene-based elastomer having a Tm or Tg lower than 0° C., and (C) a dispersion throughout said rubber composition of about 40 to about 80 phr of particulate reinforcement therefor composed of (1) about 30 to about 75 phr of synthetic precipitated silica, (2) from zero to about 10 phr of rubber reinforcing carbon black, and (3) from zero to about 30 phr of at least partially exfoliated, intercalated clay platelets, and (D) about 0.1 to about 4 phr of sulfur, and optionally 4. The process of claim 1 wherein said rubber composition is internally pre-heated prior to said application of said high frequency energy by passing the rubber composition through at least one of said directed high frequency energy stations, wherein said rubber composition contains from about 40 to about 80 phr of particulate reinforcement composed of:

(A) about 36 to about 74 phr of synthetic precipitated silica, (B) about 4 to about 6 phr of rubber reinforcing carbon black, and (C) about 0.2 to about 15 phr of at least partially exfoliated, intercalated, clay platelets.

5. The process of claim 1 wherein said rubber composition further contains a dispersion therein of from about 10 to about 40 phr of aromatic rubber processing oil and said elastomer having a Tg or Tm lower than 0° C.

6. The process of claim 1 wherein said rubber composition further contains a rubber processing oil comprised of an aromaticity content of about 20 to about 50 weight percent, a naphthenic content in a range of about 10 to about 40 weight percent and a paraffinic content in a range of from about 20 to about 50 weight percent.

7. The process of claim 1 which comprises internally preheating the rubber composition with directed high frequency energy applied by:

(A) at least one directed high frequency energy station in which radio frequency energy is applied to said rubber composition at a frequency in a range of about 0.5 to about 100 MHz, or (B) at least one directed high frequency energy station in which microwave frequency energy is applied to said rubber composition at a frequency in a range of about 900 to about 930 or from about 2300 to about 2600 MHz, or (C) a combination of:
 (1) least one directed high frequency energy station in which radio frequency energy is applied to said rubber composition at a frequency in a range of about 0.5 to about 100 MHz, and
 (2) at least one directed high frequency energy station in which microwave frequency energy is applied to said rubber composition at a frequency in a range of about 900 to about 930 or about 2300 to about 2600 MHz, or (D) a sequential combination of:
 (1) a first directed high frequency energy station in which radio frequency energy is applied to said rubber composition at a frequency in a range of about 0.5 to about 100 MHz followed by:
 (2) a subsequent directed high frequency energy station in which microwave frequency energy is applied to said rubber composition at a frequency in a range of about 900 to about 930 or about 2300 to about 2600 MHz.

8. The process of claim 1 wherein said process further comprises processing said preheated rubber composition while maintaining the temperature thereof at or above said directed energy induced temperature of at least 40° C. by:

(A) extruding said rubber composition in an extruder through a rigid die opening to thereby shape said extruded rubber composition into an elongated contoured tread strip having a contoured cross-section, building said contoured tread strip into an unvulcanized tire assembly, followed by molding said tire assembly in a suitable mold at a temperature of about 140° C. to about 160° C. to shape and vulcanize said tire assembly including said contoured tread strip to form a pneumatic tire having a circumferential running surface as a tread comprised of said vulcanized tread strip, or (B) calendering said rubber composition onto a textile fabric of tire cords by passing said rubber composition and textile fabric between two opposing cylindrical rigid rolls, said rolls revolving in opposite rotational directions to each, other to thereby pull the fabric and rubber composition therebetween and form a ply comprised of said fabric encompassed by said rubber composition, building said ply into an unvulcanized tire assembly wherein said ply extends from bead-to-bead through a crown portion of said tire assembly, followed by molding said tire assembly in a suitable mold at a temperature of about 140° C. to about 160° C. to shape and vulcanize said tire assembly to form a pneumatic tire, or (C) extruding said rubber composition in an extruder through a rigid die opening to thereby shape said extruded rubber composition into a contoured elongated sidewall insert strip having a contoured cross-section, building said contoured sidewall strip into a sidewall of an unvulcanized tire assembly, followed by molding said tire assembly in a suitable mold at a temperature of about 140° C. to about 160° C. to shape and vulcanize said tire assembly including said contoured sidewall strip to form a pneumatic tire having sidewall strip as an insert component of the tire positioned within the tire sidewall, wherein
 (1) said sidewall strip is an annular strip in a from of an apex component of the tire of which its contoured cross-section extends radially outward from a bead component of the tire into a sidewall of said tire, or
 (2) said sidewall strip is an annular strip in a form of a sidewall insert component of the tire positioned within a sidewall of said tire and spaced apart from a tire bead component of said tire.

9. The process of claim 4 wherein said process further comprises processing said preheated rubber composition while maintaining the temperature thereof at or above said directed energy induced temperature of at least 40° C. by:

(A) extruding said rubber composition in an extruder through a rigid die opening to thereby shape said extruded rubber composition into an elongated contoured tread strip having a contoured cross-section, building said contoured tread strip into an unvulcanized tire assembly, followed by molding said tire assembly in a suitable mold at a temperature of about 140° C. to about 160° C. to shape and vulcanize said tire assembly including said contoured tread strip to form a pneumatic tire having a circumferential running surface as a tread comprised of said vulcanized tread strip, or (B) calendering said rubber composition onto a textile fabric of tire cords by passing said rubber composition and textile fabric between two opposing cylindrical rigid rolls, said rolls revolving in opposite rotational directions to each, other to thereby pull the fabric and rubber composition therebetween and form a ply comprised of said fabric encompassed by said rubber composition, building said ply into an unvulcanized tire assembly wherein said ply extends from bead-to-bead through a crown portion of said tire assembly, followed by molding said tire assembly in a suitable mold at a temperature of about 140° C. to about 160° C. to shape and vulcanize said tire assembly to form a pneumatic tire, or (C) extruding said rubber composition in an extruder through a rigid die opening to thereby shape said extruded rubber composition into a contoured elongated sidewall insert strip having a contoured cross-section, building said contoured sidewall strip into a sidewall of an unvulcanized tire assembly, followed by molding said tire assembly in a suitable mold at a temperature of about 140° C. to about 160° C. to shape and vulcanize said tire assembly including said contoured sidewall strip to form a pneumatic tire having sidewall strip as an insert component of the tire positioned within the tire sidewall, wherein
   (1) said sidewall strip is an annular strip in a from of an apex component of the tire of which its contoured cross-section extends radially outward from a bead component of the tire into a sidewall of said tire, or
   (2) said sidewall strip is an annular strip in a form of a sidewall insert component of the tire positioned within a sidewall of said tire and spaced apart from a tire bead component of said tire.

10. The process of claim 4 which comprises internally preheating the rubber composition with directed high frequency energy applied by:
   (A) at least one directed high frequency energy station in which radio frequency energy is applied to said rubber composition at a frequency in a range of about 2 to about 80 MHz, or
   (B) at least one directed high frequency energy station in which microwave frequency energy is applied to said rubber composition at a frequency in a range of about 900 to about 930 or from about 2300 to about 2600 MHz, or
   (C) a combination of:
      (1) least one directed high frequency energy station in which radio frequency energy is applied to said rubber composition at a frequency in a range of about 2 to about 80 MHz, and
      (2) at least one directed high frequency energy station in which microwave frequency energy is applied to said rubber composition at a frequency in a range of about 900 to about 930 or about 2300 to about 2600 MHz, or
   (D) a sequential combination of:
      (1) a first directed high frequency energy station in which radio frequency energy is applied to said rubber composition at a frequency in a range of about 2 to about 80 MHz followed by:
      (2) a subsequent directed high frequency energy station in which microwave frequency energy is applied to said rubber composition at a frequency in a range of about 900 to about 930 or about 2300 to about 2600 MHz.

11. The process of claim 10 wherein said process further comprises processing said preheated rubber composition while maintaining the temperature thereof at or above said directed energy induced temperature of at least 40° C. by:
   (A) extruding said rubber composition in an extruder through a rigid die opening to thereby shape said extruded rubber composition into an elongated contoured tread strip having a contoured cross-section, building said contoured tread strip into an unvulcanized tire assembly, followed by molding said tire assembly in a suitable mold at a temperature of about 140° C. to about 160° C. to shape and vulcanize said tire assembly including said contoured tread strip to form a pneumatic tire having a circumferential running surface as a tread comprised of said vulcanized tread strip, or
   (B) calendering said rubber composition onto a textile fabric of tire cords by passing said rubber composition and textile fabric between two opposing cylindrical rigid rolls, said rolls revolving in opposite rotational directions to each, other to thereby pull the fabric and rubber composition therebetween and form a ply comprised of said fabric encompassed by said rubber composition, building said ply into an unvulcanized tire assembly wherein said ply extends from bead-to-bead through a crown portion of said tire assembly, followed by molding said tire assembly in a suitable mold at a temperature of about 140° C. to about 160° C. to shape and vulcanize said tire assembly to form a pneumatic tire, or
   (C) extruding said rubber composition in an extruder through a rigid die opening to thereby shape said extruded rubber composition into a contoured elongated sidewall insert strip having a contoured cross-section, building said contoured sidewall strip into a sidewall of an unvulcanized tire assembly, followed by molding said tire assembly in a suitable mold at a temperature of about 140° C. to about 160° C. to shape and vulcanize said tire assembly including said contoured sidewall strip to form a pneumatic tire having sidewall strip as an insert component of the tire positioned within the tire sidewall, wherein
      (1) said sidewall strip is an annular strip in a from of an apex component of the tire of which its contoured cross-section extends radially outward from a bead component of the tire into a sidewall of said tire, or
      (2) said sidewall strip is an annular strip in a form of a sidewall insert component of the tire positioned within a sidewall of said tire and spaced apart from a tire bead component of said tire.

12. The process of claim 1 wherein said process further comprises processing said preheated rubber composition while maintaining the temperature thereof at or above said directed energy induced temperature of at least 40° C. by extruding said rubber composition in an extruder through a rigid die opening to thereby shape said extruded rubber composition into a shaped unvulcanized rubber component, building said shaped component into an unvulcanized tire assembly, followed by molding said tire assembly in a suitable mold at a temperature of about 140° C. to about 160° C. to shape and vulcanize said tire assembly to form a pneumatic tire.

* * * * *